(12) United States Patent
Abbeloos et al.

(10) Patent No.: US 12,236,673 B2
(45) Date of Patent: Feb. 25, 2025

(54) SYSTEM AND METHOD FOR TRAINING A MODEL TO PERFORM SEMANTIC SEGMENTATION ON LOW VISIBILITY IMAGES USING HIGH VISIBILITY IMAGES HAVING A CLOSE CAMERA VIEW

(71) Applicants: TOYOTA MOTOR EUROPE, Brussels (BE); ETH ZURICH, Zurich (CH)

(72) Inventors: Wim Abbeloos, Brussels (BE); Christos Sakaridis, Zurich (CH); Luc Van Gool, Zurich (CH); Dengxin Dai, Zurich (CH)

(73) Assignees: TOYOTA JIDOSHA KABUSHIKI KAISHA, Toyota (JP); ETH ZURICH, Zurich (CH)

( * ) Notice: Subject to any disclaimer, the term of this patent is extended or adjusted under 35 U.S.C. 154(b) by 409 days.

(21) Appl. No.: 17/625,590

(22) PCT Filed: Jul. 10, 2019

(86) PCT No.: PCT/EP2019/068603
§ 371 (c)(1),
(2) Date: Jan. 7, 2022

(87) PCT Pub. No.: WO2021/004633
PCT Pub. Date: Jan. 14, 2021

(65) Prior Publication Data
US 2022/0284696 A1    Sep. 8, 2022

(51) Int. Cl.
*G06V 10/774*    (2022.01)
*G06T 7/11*    (2017.01)
*G06V 20/56*    (2022.01)

(52) U.S. Cl.
CPC .............. *G06V 10/774* (2022.01); *G06T 7/11* (2017.01); *G06V 20/56* (2022.01); *G06T 2207/20028* (2013.01); *G06T 2207/20081* (2013.01)

(58) Field of Classification Search
CPC .......... G06F 18/00; G06T 2207/10024; G06T 2207/20028; G06T 2207/20081;
(Continued)

(56) References Cited

U.S. PATENT DOCUMENTS

2017/0287170 A1*  10/2017  Perona ................... G06V 20/56

FOREIGN PATENT DOCUMENTS

| CN | 107239203 A | * 10/2017 | |
|---|---|---|---|
| CN | 107424205 A | * 12/2017 | ........... G06T 15/005 |

OTHER PUBLICATIONS

Dai et al, "Dark Model Adaptation: Semantic Image Segmentation from Daytime to Nighttime", ITSC, 2018 (Year: 2018).*
(Continued)

*Primary Examiner* — Ruiping Li
(74) *Attorney, Agent, or Firm* — Dinsmore & Shohl LLP (57) ABSTRACT

A system and a method for training a semantic segmentation model includes obtaining a plurality of sets of images each having an index z for visibility, iteratively training the model. Iteratively training the model includes (a) for each z above 1, obtaining preliminary semantic segmentation labels for each image of the set of images of index z–1 by applying the model to each image of the set of images of index z–1, (b) processing each preliminary semantic segmentation labels using semantic segmentation labels obtained using the model on a selected image of index 1, and obtaining processed semantic segmentation labels, (c) training the model using the set of images of index z–1 and the associ-
(Continued)

ated processed semantic segmentation labels, and (d) performing steps (a) to (c) for z+1.

7 Claims, 4 Drawing Sheets

(58) Field of Classification Search
CPC . G06T 2207/20084; G06T 2207/30252; G06T 7/11; G06V 10/774; G06V 20/56
See application file for complete search history.

(56) References Cited

OTHER PUBLICATIONS

International Search Report and Written Opinion dated Jan. 14, 2021 in related International Application No. PCT/US2019/068603.

Yang Zou et al, "Domain Adaptation for Semantic Segmentation via Class-Balanced Self-Training", arxiv.org, Cornell University Library, 201 Olin Library Cornell University Ithaca, NY 14853,Oct. 18, 2018 (Oct. 18, 2018).

Christos Sakaridis et al, "Semantic Nighttime Image Segmentation with Synthetic Stylized Data, Gradual Adaptation and Uncertainty-Aware Evaluation", arxiv.org, Cornell University Library, 201 Olin Library Cornell University Ithaca, NY 14853,Jan. 17, 2019 (Jan. 17, 2019).

Paolo Russo et al, "From Source to Target and Back: Symmetric Bi-Directional Adaptive GAN", Nov. 29, 2017 (Nov. 29, 2017), Internet: URL:https://arxiv.org/pdf/1705.08824.pdf.

Dengxin Dai et al, "Curriculum Model Adaptation with Synthetic and Real Data for Semantic Foggy Scene Understanding", arxiv.org, Cornell University Library, 201 Olin Library Cornell University Ithaca, NY 14853,May 1, 2019 (May 1, 2019).

Kaiming He et al, "Guided Image Filtering", IEEE Transactions on Pattern Analysis and Machine Intelligence, vol. 35, No. 6, Jun. 1, 2013 (Jun. 1, 2013), p. 1397-1409.

* cited by examiner

SYSTEM AND METHOD FOR TRAINING A MODEL TO PERFORM SEMANTIC SEGMENTATION ON LOW VISIBILITY IMAGES USING HIGH VISIBILITY IMAGES HAVING A CLOSE CAMERA VIEW

CROSS-REFERENCE TO RELATED APPLICATION

The present application is a national phase application of International Patent Application PCT/EP2019/068603 filed on Jul. 10, 2019, the entire contents of which are herein incorporated by reference.

FIELD OF THE DISCLOSURE

The present application relates to the field of image processing, and more precisely to the semantic segmentation of images taken under low visibility conditions, for example at night time, i.e. without solar illumination.

BACKGROUND

Semantic image segmentation is a method to automatically determine the semantic labels of the objects which appear in an image. For example, the image may be acquired by a camera mounted in a vehicle. Semantic segmentation of such an image allows recognizing cars, pedestrians, traffic lanes, etc. Therefore, semantic segmentation is the backbone technique for autonomous driving systems or other automated systems.

Semantic image segmentation typically uses models such as neural networks or deep neural networks to perform the segmentation. These models need to be trained.

Training a model typically comprises inputting known images to the model. For these images, a predetermined semantic segmentation is already known (an operator may have prepared the predetermined semantic segmentations of each image by annotating the images). The output of the model is then evaluated in view of the predetermined semantic segmentation, and the parameters of the model are adjusted if the output of the model differs from the predetermined semantic segmentation of an image.

It follows that in order to train a semantic segmentation model, a large number of images and predetermined semantic segmentations are necessary.

Consequentially, a large number of images in all possible visibility conditions is necessary.

For example, it has been observed that the illumination condition at nighttime (in particular when there is no direct solar illumination but e.g. only electrical street lights, i.e. nocturnal artificial lighting) creates visibility problems for drivers and for automated systems. While sensors and computer vision algorithms are constantly getting better, the improvements are usually benchmarked with images taken during daylight time. Those methods often fail to work in nighttime conditions. This prevents the automated systems from actually being used: it is not conceivable for a vehicle to avoid nighttime, and the vehicle has to be able to distinguish different objects during daytime and nighttime conditions.

Compared to daylight, nocturnal artificial lighting degrades the visibility of a scene significantly, according to the darkness of the driving scene.

It is thus desirable to train semantic segmentation models with nighttime images (images taken at night time with no direct solar illumination but e.g. only electrical street lights, i.e. nocturnal artificial lighting).

However, obtaining semantic segmentation data on nighttime images (for example nighttime pictures taken by a camera) is particularly difficult and time-consuming, especially if an operator has to annotate the nighttime images by hand with semantic labels before feeding the nighttime images to the model.

Similar issues have been observed under different low visibility conditions, for example in foggy images. In this regard, it has been proposed a method for dense fog scene understanding by using both synthetic and real fog (cf.: European Conference of Computer Vision, Sakaridis, C., Dai, D., Hecker, S., Van Gool, L., 2018, or: International Journal of Computer Vision, Dai, D., Sakaridis, C., Hecker, S., Van Gool, L., 2019: "Curriculum Model Adaptation with Synthetic and Real Data for Semantic Foggy Scene Understanding). In their work, images taken under light fog are used as a bridge to transfer semantic knowledge from clear-weather condition to dense-fog condition. However, due to the different objective and in particular due to the different characteristics of foggy images compared to nighttime images (in particular with nocturnal artificial lighting), the proposed learning algorithm is not suitable for the objective of the present disclosure.

A similar approach has been used in document "Dark model adaptation: Semantic image segmentation from daytime to nighttime" (Dai, D. and Van Gool, L, IEEE International Conference on Intelligent Transportation Systems, 2018) wherein a model is gradually trained from daytime to nighttime. However, the solution of this document suffers from the accumulation of errors in obtaining semantic segmentation labels.

It is a primary object of the disclosure to provide methods and system that overcome the deficiencies of the currently available systems and methods.

In particular, it remains desirable to reliably train a model performing semantic segmentation of low visibility images.

SUMMARY OF THE DISCLOSURE

The present disclosure overcomes one or more deficiencies of the prior art by proposing a method for training a semantic segmentation model to be used for semantic segmentation of images taken under low visibility conditions, comprising:

obtaining a plurality of sets of images, each set of images being associated with an index z comprised between 1 and Z, the index z indicating a level of visibility of the images of the set of images changing from 1 to Z, wherein the model is initially trained to perform semantic segmentation under the level of visibility of level 1, and, iteratively training the model comprising:
a—for each z above 1, obtaining preliminary semantic segmentation labels for each image of the set of images of index z−1 by applying the model to each image of the set of images of index z−1,
b—processing each preliminary semantic segmentation labels using semantic segmentation labels obtained using the model on a selected image of the set of index 1, said selected image being selected as the image having the camera view which is the closest to the camera view of the image associated with the preliminary semantic segmentation label, and obtaining processed semantic segmentation labels, c—training the model using the set of images of index z−1 and the associated processed semantic segmentation labels, d—performing steps a to c for z+1.

For example, the level of visibility is different for every index, 1 being the index for which the model has been trained in a preliminary step.

Also, in another example, the level of visibility decreases from 1 (high visibility, a level set by the person skilled in the art) to Z (low visibility, a level set by the person skilled in the art).

The disclosure proposes to use multiple sets of images which may be images taken by cameras embedded on vehicles, for example so that the images represent driving scenes. For example, the images are photographs of the street taken from a road, i.e. from a position that a vehicle may use. Each set of images is associated with an index which the person skilled in the art may define so that when the index increases, the overall visibility decreases.

For example, the visibility could be associated with:
a level of solar illumination, the index z indicating a level of solar illumination, with 1 corresponding to daytime and Z corresponding to nighttime, and the visibility decreasing between 1 and Z,
a level of fog density, the index z indicating a level of fog density, with 1 corresponding to an absence of fog and Z corresponding to a level of fog density set by the person skilled in the art, and the visibility decreasing between 1 and Z,
a level of noise on the image, the index z indicating a level of noise, with 1 corresponding to an absence of noise and Z corresponding to a level of noise set by the person skilled in the art, and the visibility decreasing between 1 and Z,
a color cast on the image (for example due to illumination conditions, with 1 corresponding to a given color every remaining index being associated with a different color.

The disclosure is however not limited to these examples and applies to other types of low visibility conditions (rain, snow, sand storm, dusty conditions, etc.).

The disclosure also applies to combinations of low visibility conditions (for example rain at nighttime).

Also, the expressions "low visibility conditions" and "high visibility conditions" merely indicate that the visibility (for example according to a criterion set by the person skilled in the art) is better under the "high visibility conditions" than under the "low visibility conditions, the gap between the two visibility conditions can be chosen by the person skilled in the art according to the application.

Instead of directly using the semantic segmentation labels from the set of images of index z−1 to train the model at level z (so that the model is further trained to be able to perform semantic segmentation on darker images), the disclosure proposes to process these semantic segmentation labels (called preliminary semantic segmentation labels) so that they contain less errors. In order to improve the quality of these labels, an image taken under high visibility conditions is selected because this image is easier to process by a semantic segmentation model. If the selected image and the image from the set of index z−1 substantially show the same scene, then the labels from this image could be similar, especially for static objects such as buildings, roads, marked lanes.

Consequentially, the training is improved and the model is better suited to detect objects under low visibility conditions.

Two camera views may be close if the pose of the image acquisition device (i.e. a camera) used to acquire the images is close. In the present application, the wording pose may refer to 6D pose of the image acquisition device used to obtain an image. "6D pose" is an expression well known to the person skilled in the art which designates the combination of the three-dimensional position and of the three-dimensional orientation of an object. The person skilled in the art will know how to determine that two poses are close to each other or how to determine that two camera views are close to each other.

To summarize, the camera view of an image defines the scene seen by a camera which has been used to acquire this image.

It should be noted that all the sets of images may be acquired in a same region (for example in a same urban area such as a same city), but at different times (for example during the day for daytime—high visibility and during the night for nighttime low visibility).

According to a particular embodiment, the method comprises a preliminary step of obtaining the semantic segmentation labels for all the images of the set of index 1 using the model.

These semantic segmentation labels for all the images of the set of index 1 using the model may then be re-used for every implementation of step b.

According to a particular embodiment, step b comprises:
using a cross bilateral filter between said semantic segmentation labels obtained using the model on a selected image of the set of index 1 and the image, and
performing a fusion of the output of the bilateral filter with the semantic segmentation labels obtained using the model on the image.

It should be noted that the person skilled in the art will know how to implement a cross bilateral filter. An example of such a filter is given in "A Fast Approximation of the Bilateral Filter Using a Signal Processing Approach" (S. Paris, F. Durant, Int J Comput Vis (2009) 81: 24-52), and more precisely in section 2.3 of this document.

In the present application, fusion may refer to a weighted combination of the output of the bilateral filter (which may be called aligned soft predictions) and the image (an image with low visibility).

According to a particular embodiment, the cross bilateral filter performs the following function:

$$\tilde{S}^1(p) = \frac{\sum_{q \in \mathcal{N}(p)} G_{\sigma_s}(\|q-p\|) G_{\sigma_r}(\|I^z(q) - I^z(p)\|) S^1(q)}{\sum_{q \in \mathcal{N}(p)} G_{\sigma_s}(\|q-p\|) G_{\sigma_r}(\|I^z(q) - I^z(p)\|)}.$$

in which:
p and q are pixel positions,
$\tilde{S}^1(p)$ is the output of the cross bilateral filter for a pixel p,
$\mathcal{N}(p)$ is the neighborhood of p,
$G_{\sigma_s}$ is the spatial-domain Gaussian kernel,
$G_{\sigma_s}$ is the color-domain kernel,
$I^z(q)$ and $I^z(p)$ respectively designate the color value at pixel q and pixel p in an image from a set of index z, and
$S^1(q)$ is the semantic segmentation label at pixel q for the selected image obtained using the model.

According to a particular embodiment, performing a fusion the output of the bilateral filter with the semantic segmentation labels obtained using the model on the image comprises using the following function:

$$\hat{S}^z = \frac{F^z}{F^z + \alpha F^1} S^z + \frac{\alpha F^1}{F^z + \alpha F^1} S^1$$

in which:
$\hat{S}^z$ is the output of a fusion function,
$F^1$ is equal to $$\max_{c \in \mathcal{C}} \hat{S}_c^1(p)$$

and is the maximum output value of the semantic segmentation label at pixel p for the selected image for all possible classes $\mathcal{C}$, c designating the class having the highest output,
$F^z$ is equal to $$\max_{c \in \mathcal{C}} \hat{S}_c^z(p)$$

and is me maximum output value of the semantic segmentation label at pixel p for the image, and
$\alpha$ a coefficient chosen between 0 and 1.

The above function performs a weighted combination of the output of the bilateral filter (which may be called aligned soft predictions) and of the image.

According to a particular embodiment, $\alpha$ is a function of a pixel p:

$$\alpha(p) = \begin{cases} \alpha_l, & \text{if } c_1 = \arg\max_{c \in C} \hat{S}_c^1(p) \in C_d \text{ and } S_{c_1}^z(p) \leq \eta \\ & \text{or } c_2 = \arg\max_{c \in C} S_c^z(p) \in C_d \text{ and } \hat{S}_{c_2}^1(p) \leq \eta, \\ \alpha_h & \text{otherwise.} \end{cases}$$

According to a particular embodiment, the method comprises obtaining an annotated set of images having a level of visibility of level 1 with the associated semantic segmentation labels, and training the model with the annotated set of images and the associated semantic segmentation labels.

This annotated set of images may have been annotated by an operator so as to associate the pixels of the images of this set of images taken under high visibility conditions with objects classes (for example from a predefined set of classes of objects).

This annotated set is particularly useful to train the model in a manner that ensures that the semantic segmentation labels on the images of the set of index 1 are accurate.

According to a particular embodiment, the method further comprises generating at least one set of generated images so that the set of generated images has a level visibility corresponding to an index above one using the annotated set of images, and training the model using the at least one set of generated images and the semantic segmentation labels associated with the annotated set of images.

For example, it is possible to generate sets of generated images for every index above 1.

Also, generating a set of generated images may comprise darkening the images from the set of annotated images.

This embodiment further improves the training.

The disclosure also provides a system for training a semantic segmentation model to be used for semantic segmentation of images taken under low visibility conditions, comprising:

a module for obtaining a plurality of sets of images, each set of images being associated with an index z comprised between 1 and Z, the index z indicating a level of visibility of the set of images changing from 1 to Z, wherein the model is initially trained to perform semantic segmentation under the level of visibility of level 1, a module for iteratively training the model configured to perform the following steps:
  a—for each z above 1, obtaining preliminary semantic segmentation labels for each image of the set of images of index z−1 by applying the model to each image of the set of images of index z−1,
  b—processing each preliminary semantic segmentation label using semantic segmentation labels obtained using the model on a selected image of the set of index 1, said selected image being selected as the image having the camera view which is the closest to the camera view of the image associated with the preliminary semantic segmentation label, and obtaining processed semantic segmentation labels,
  c—training the model using the set of images of index z−1 and the associated processed semantic segmentation labels,
  d—performing steps a to c for z+1.

This system may be configured to perform all the embodiments of the method as defined above.

The disclosure also provides a model to be used for semantic segmentation trained by the method as defined above.

The disclosure also provides a vehicle comprising an image acquisition module and a system comprising the model trained by the method as defined above to perform semantic segmentation on the images acquired by the image acquisition module.

The present disclosure further relates to a computer program including instructions for executing the steps of a method as described above when said program is executed by a computer.

This program can use any programming language and take the form of source code, object code or a code intermediate between source code and object code, such as a partially compiled form, or any other desirable form.

The present disclosure further relates to a recording medium readable by a computer and having recorded thereon a computer program including instructions for executing the steps of a method as described above.

The information medium can be any entity or device capable of storing the program. For example, the medium can include storage means such as a ROM, for example a CD ROM or a microelectronic circuit ROM, or magnetic storage means, for example a diskette (floppy disk) or a hard disk.

Alternatively, the information medium can be an integrated circuit in which the program is incorporated, the circuit being adapted to execute the method in question or to be used in its execution.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, and serve to explain the principles thereof.

BRIEF DESCRIPTION OF THE DRAWINGS

How the present disclosure may be put into effect will now be described by way of example with reference to the appended drawings, in which.

DETAILED DESCRIPTION

Reference will now be made in detail to exemplary embodiments of the disclosure, examples of which are illustrated in the accompanying drawings. Wherever possible, the same reference numbers will be used throughout the drawings to refer to the same or like parts.

In the present detailed description, examples are given for semantic segmentation of images taken at nighttime. The disclosure is however not limited to a visibility associated with a level of solar illumination.

Training a segmentation model with a large amount of human annotations should work for nighttime images, similar to what has been achieved for daytime scene understanding. However, applying this protocol to other illumination conditions is problematic as it is hardly affordable to annotate the same amount of data for all different conditions and their combinations. It is thus proposed to depart from this protocol and propose an automated approach to transfer the knowledge from annotations of daytime scenes (presumably of good quality) to nighttime scenes. The approach leverages the fact that illumination changes continuously between daytime and nighttime, through the twilight time. Twilight is the time between dawn and sunrise, or between sunset and dusk. Twilight is defined according to the solar elevation angle, which is the position of the geometric center of the sun relative to the horizon, cf. e.g. Definitions from the US astronomical applications dept (usno). Retrieved Jul. 22, 2011.

During a large portion of twilight time, solar illumination suffices enough for cameras to capture the terrestrial objects and suffices enough to alleviate the interference of artificial lights to a limited amount. These observations lead to our conjecture that the domain discrepancy between daytime scenes and twilight scenes, and the domain discrepancy between twilight scenes and nighttime scenes are both smaller than the domain discrepancy between daytime scenes and nighttime scenes. Thus, images captured during twilight time can in principle be used to serve our purpose—knowledge transfer from daytime to nighttime. That is, twilight time constructs a bridge for knowledge transfer from our source domain daytime to our target domain nighttime.

In particular, the proposed method uses the proximity in the camera view between images taken at daytime and later on (from twilight to nighttime), so as to improve the annotations obtained for the images taken from twilight to nighttime. For example, the position of a road between a daytime image and a nighttime image may not change if the two pictures show substantially the same scene: the detection of the road in the daytime image may improve the detection of the road in the nighttime image.

Figure 1:
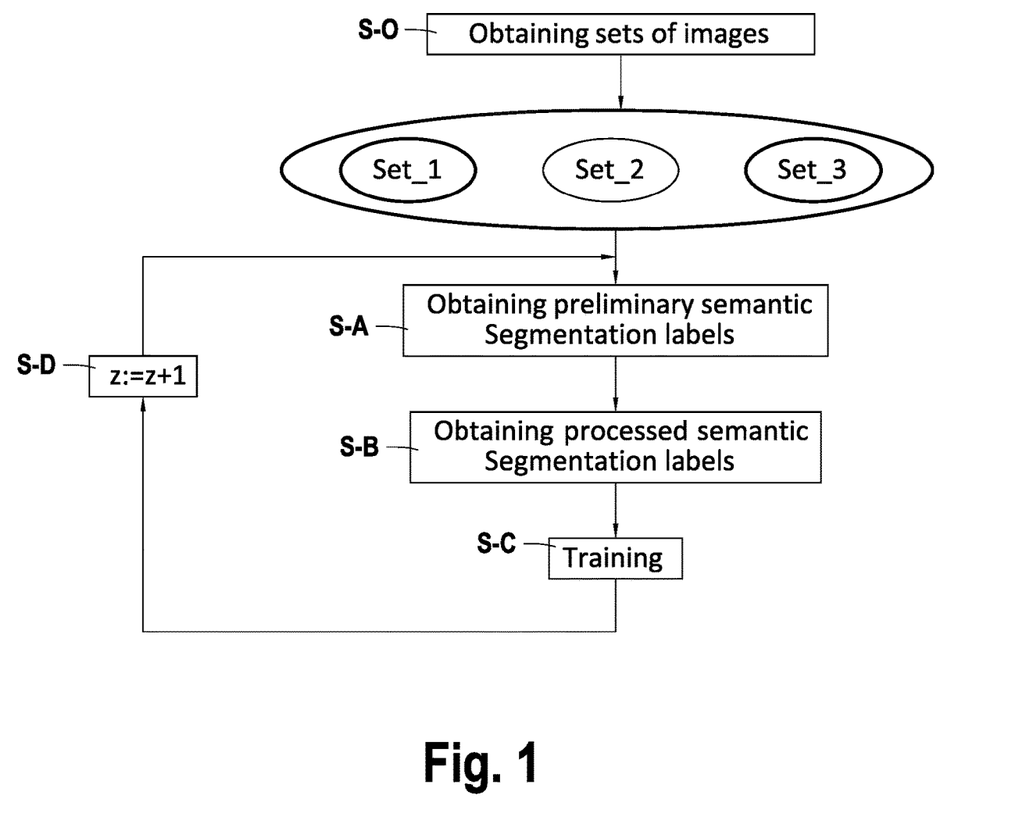
FIG. 1 shows a schematic flow chart of the steps for training a model performing semantic segmentation of nighttime images according to embodiments of the present disclosure.

FIG. 1 shows a schematic flow chart of a method for training a model to perform semantic segmentation on images taken during nighttime.

In the present examples, three levels of solar illumination are used: daytime, twilight, and nighttime. The disclosure is however not limited to three levels but could also be implemented with a number above three.

In the present example, a first step S_0 is implemented in which three sets of images are obtained: Set_1, Set_2, and Set_3. The images of these sets are driving scenes taken in a same region, for example in a same city.

The index of solar illumination z is respectively 1, 2, and 3 for the sets of images Set_1, Set_2, and Set_3.

Although not represented on the figure, a preliminary step in which an annotated set of images taken during daytime may be obtained, along with the associated semantic segmentation labels, and training the model with the annotated set of images and the associated semantic segmentation labels may be performed. This preliminary step ensures that the model can perform semantic segmentation on daytime images.

In addition to the images from sets Set_1, Set_2, and Set_3, it is possible to leverage additional data from the annotated set of images by generating two sets of generated images so that the two sets of generated images have a respective level of solar illumination of 2 and 3. This generation may be performed using the annotated set of images and a generative adversarial training method such as CycleGAN (described in "Unpaired image-to-image translation using cycle-consistent adversarial networks", J.-Y Zhu, T. Park, P. Isola, and A. A. Efros, The IEEE International Conference on Computer Vision, October 2017).

It is possible to define the data which will be used as follows. The labeled daytime driving dataset with M real images $\mathcal{D}_{lr}^1=\{(I_m^1, Y_m^1)\}_{m=1}^M$ where $Y_m^1(i, j) \in \mathcal{C} = \{1, \ldots, C\}$ is the ground-truth label of pixel $(i, j)$ of $I_m^1$; an unlabeled daytime dataset (Set_1) of $N_1$ images $\mathcal{D}_{ur}^1=\{I_n^1\}_{n=1}^{N_1}$; an unlabeled twilight time dataset (Set_2) of $N_2$ images $\mathcal{D}_{ur}^2\{I_n^2\}_{n=1}^{N_2}$; and an unlabeled nighttime dataset (Set_3) of $N_3$ images $\mathcal{D}_{ur}^3=\{I_n^3\}_{n=1}^{N_3}$.

If generated images are used, $\mathcal{D}_{lr}^1$ needs to be rendered into the style of $\mathcal{D}_{ur}^2$ and $\mathcal{D}_{ur}^3$. Using CycleGAN, the following sets are obtained: $\mathcal{D}_{ls}^2=\{(\bar{I}_m^2, Y_m^2)\}_{m=1}^M$ and $\mathcal{D}_{ls}^3=\{(\bar{I}_m^3, Y_m^3)\}_{m=1}^M$, where $\bar{I}_m^2$ and $\bar{I}_m^3$ are the stylized twilight time version and stylized nighttime version of $I_m^1$. $Y_m^3$ and $Y_m^2$ are the same as $Y_m^1$.

As explained above, for daytime (i.e. z=1), the model, designated as $\phi^1$ (the index is 1 because it is applied on images of daytime), can be trained directly on $\mathcal{D}_{lr}^1$, as they are human labeled. In order to perform knowledge transfer with unlabeled data, pseudo-labels for all the three unlabeled real datasets need to be generated.

The following table identifies the sets of images and their label; I indicates an image and Y its label map; Ī is a synthetic image and Ŷ a pseudo-label map:

|  | Labeled | | Unlabeled |
|---|---|---|---|
|  | Real | Generated | Real |
| 1. Daytime | $\{(I_m^1, Y_m^1)\}_{m=1}^M$ |  | $\{(I_n^1, \hat{Y}_n^1)\}_{n=1}^{N_1}$ |
| 2. Twilight Time |  | $\{(\bar{I}_m^2, Y_m^2)\}_{m=1}^M$ | $\{(I_n^2, \hat{Y}_n^2)\}_{n=1}^{N_2}$ |
| 3. Nighttime |  | $\{(\bar{I}_m^3, Y_m^3)\}_{m=1}^M$ | $\{(I_n^3, \hat{Y}_n^3)\}_{n=1}^{N_3}$ |

In the present example, the adaptation from $z-1$ to $z$ will be described. More precisely, semantic segmentation labels are processed at level $z-1$ so that the images and the processed labels from $z-1$ can be used to train the model $\phi^z$.

Thus, in a step S_A, preliminary semantic segmentation labels are obtained for the images of index $z-1$ ($z$ being superior or equal to 2). These preliminary semantic segmentation labels are obtained using the model as follows:

$$\phi^{z-1}(I_n^{z-1})$$

It has been observed by the inventors of the present disclosure that) $\phi^{z-1}(I_n^{z-1})$ may suffer from an accumulation of errors. In order to reduce these errors, a process is used to improve the semantic segmentation labels using the following formula:

$$\hat{Y}_n^{z-1} = G(\phi^{z-1}(I_n^{z-1}), I_n^{z-1}, \phi^1(I_{A_{z-1\to1}(n)}^1)),$$

This formula processes each preliminary semantic segmentation label of index $z-1$ using semantic segmentation labels obtained using the model on a selected image of the set of index 1, said selected image being selected as the image having the camera view which is the closest to the camera view of the image associated with the preliminary semantic segmentation label, so as to obtain processed semantic segmentation labels.

In the above formula, $\hat{Y}_n^{z-1}$ is the processed semantic segmentation label, G is a guidance function which will be described in greater detail hereinafter, $I_n^{z-1}$ is the image from the set of index $z-1$, $A_{z-1\to1}(n)$ is a correspondence function identifying the image from Set_1 (index 1) which shows the closest camera view to the camera view of $I_n^{z-1}$.

$A_{z-1\to1}(n)$ may be a function which uses the GPS coordinates associated with the images at different driving times on a same road to detect similarities in the camera views (or in the 6D pose of the cameras used to acquire the images). Additional parameters may be used to select the image from Set_1 which shows the closest camera view.

The guidance function G can be rewritten as (for an index $z$ so as to simplify the notations):

$$G(\phi^z(I^z), I^z, \phi^1(I^1)) = R(\phi^z(I^z), B(\phi^1(I^1), I^z))$$

Wherein:
B is a cross bilateral filter between the semantic segmentation labels obtained using the model on a selected image of the set of index 1 $\phi^1(I^1)$ (obtained with $A_{z-1\to1}(n)$) and the image $I^z$, and
R fuses the output of the bilateral filter with the semantic segmentation labels obtained using the model on the image $\phi^z(I^z)$, R may also be designated as a fusion function.

Because the real images such as $I^z$ may not be perfectly aligned with the images from the set of index 1, a cross bilateral filter is used in which the following notation is used, $S^1 = \phi^1(I^1)$:

$$\tilde{S}^1(p) = \frac{\sum_{q \in \mathcal{N}(p)} G_{\sigma_s}(\|q-p\|) G_{\sigma_r}(\|I^z(q) - I^z(p)\|) S^1(q)}{\sum_{q \in \mathcal{N}(p)} G_{\sigma_s}(\|q-p\|) G_{\sigma_r}(\|I^z(q) - I^z(p)\|)}$$

Wherein $\tilde{S}^1(p)$ is the output of the bilateral filter for a pixel p, p and q denote pixel positions ($\|q-p\|$ is the distance between the two pixels), $\mathcal{N}(p)$ is the neighborhood of p, $G_{\sigma_s}$ is the spatial-domain Gaussian kernel and $G_{\sigma_r}$ is the color-domain kernel.

In the above formula, the CIELAB version of $I^z$ is used for the color-domain kernel as it is more appropriate for measuring color similarity. The two parameters of the spatial and color domain kernels may be respectively set at $\sigma_s$ to 80 to account for large misalignment and $\sigma_r$ to 10.

Then, a fusion is performed between the output of the cross bilateral filter. An adaptive fusion scheme is proposed, which uses a confidence value associated with the two predictions at each pixel to weigh their contribution in the output and addresses disagreements due to dynamic content (i.e. moving objects in the driving scene) by properly adjusting the fusion weights. The confidence of the aligned prediction $\tilde{S}^1$ for $I^1$ at pixel p is $$F^1(p) = \max_{c \in \mathcal{C}} \tilde{S}_c^1(p)$$

and respectively the confidence of the initial prediction $S^z$ for $I^z$ for pixel p is $$F^z(p) = \max_{c \in \mathcal{C}} \tilde{S}_c^{z1}(p),$$

with $\mathcal{C}$ the set of C semantic classes (typically car, pedestrian, road, lane, etc.). The fusion function is:

$$\hat{S}^z = \frac{F^z}{F^z + \alpha F^1} S^z + \frac{\alpha F^1}{F^z + \alpha F^1} \tilde{S}^1,$$

With $0 < \alpha = \alpha(p) \leq 1$, which may vary according to the pixel. In the above equation, the pixel argument p is not written for the sake of conciseness. This formula allows the daytime image prediction to have a greater effect on the output at regions of the dark image which were not easy for model $\phi_z$ to classify, while preserving the initial prediction $S^z$ at lighter regions of the dark image where $S^z$ is more reliable.

The above fusion function may distinguish between dynamic and static scene content by modifying the value of $\alpha$. In particular, $\alpha$ may reduce the influence of $\tilde{S}^1$ to induce a preference towards $S^z$ when both predictions have high confidence. However, apart from imperfect alignment, the two scenes also differ due to dynamic content (typically moving objects such as cars which are not likely to be present on two images of a same scene). Also, the prediction of a dynamic object in the daytime image should be assigned a lower weight in case the corresponding prediction in the dark image differs, since this object might only be present in the daytime image. More formally, we denote the subset of C that includes dynamic classes by $\mathcal{C}_d$ (the class of dynamic or moving objects) and define $$\alpha(p) = \begin{cases} \alpha_l, & \text{if } c_1 = \arg\max_{c \in \mathcal{C}} \tilde{S}_c^1(p) \in \mathcal{C}_d \text{ and } S_{c_1}^z(p) \leq \eta \\ & \text{or } c_2 = \arg\max_{c \in \mathcal{C}} S_c^z(p) \in \mathcal{C}_d \text{ and } \tilde{S}_{c_2}^1(p) \leq \eta, \\ \alpha_h & \text{otherwise.} \end{cases}$$

It has been observed by the inventors that good results may be obtained with set $\alpha_l = 0.3$, $\alpha_h = 0.6$ and $\eta = 0.2$.

With the processed semantic segmentation labels obtained $\hat{S}^z$, it is possible to use the images $I^z$ to train the model for images at the next index: $z+1$.

Step S_C is then performed in which training is performed.

Training a model $\phi^z$ is performed with a loss function that involves both the synthetic labeled dataset $\mathcal{D}_{syn}{}^z$ and the real dataset $\mathcal{D}_{real}{}^z$ with labels inferred processed as explained above:

$$\min_{\phi_z}\left(\sum_{\substack{(I',Y')\\ \in \mathcal{D}_{syn}^z}} L(\phi^z(I'),Y') + \mu \sum_{\substack{(I'',Y'')\\ \in \mathcal{D}_{real}^z}} L(\phi^z(I''),Y'')\right)$$

Where L is the cross-entropy loss and μ is a hyperparameter balancing the contribution of the two datasets which may be set in a calibration step.

Then, steps S_A to S_C are repeated (Step S_D) with z replaced by z+1 (in this example, until z=3).

It has been observed by the inventors that the above method provides significant improvement over the method described in document "Dark model adaptation: Semantic image segmentation from daytime to nighttime" (Dai, D. and Van Gool, L, IEEE International Conference on Intelligent Transportation Systems, 2018).

Figure 2:
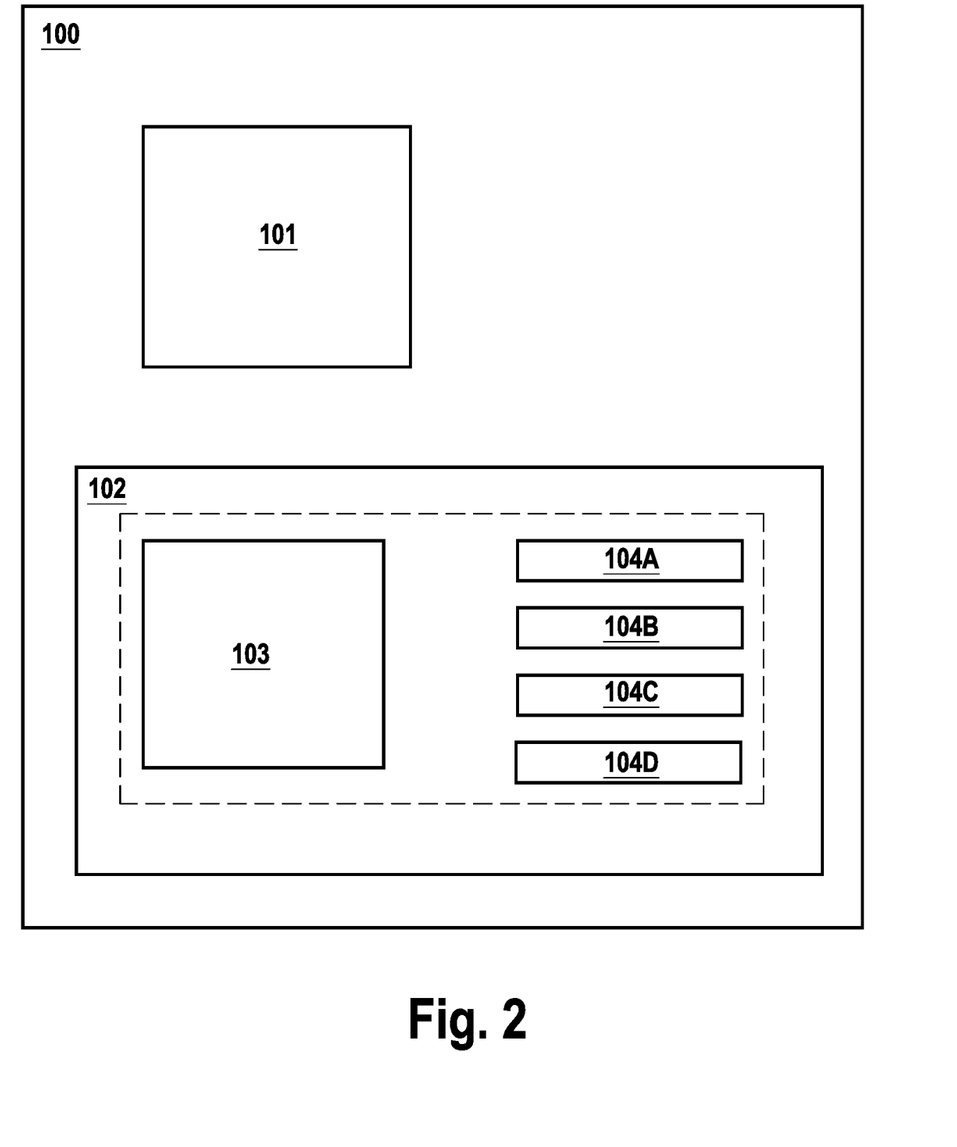
FIG. 2 shows a system for training a model.

FIG. 2 shows a system 100 for training a semantic segmentation model to be used for semantic segmentation of images taken at nighttime, the model being initially trained to perform semantic segmentation at daytime. This system may be used to perform the method as described above.

The system 100 comprises a processor 101 and a memory 103 comprising computer program instructions INST, which, when executed by the processor 101, perform the method.

More precisely, the memory 103 comprises:

Instructions which, with the processor 101, form a module for obtaining a plurality of sets of images, each set of images being associated with an index z comprised between 1 and Z, the index z indicating a level of solar illumination of the images of the set of images decreasing from 1, corresponding to daytime, to Z, corresponding to nighttime, Instructions 104A to 104C to iteratively train the model which form a module for training with the processor and more precisely:

Instructions 104A: for each z above 1, obtaining preliminary semantic segmentation labels for each image of the set of images of index z−1 by applying the model to each image of the set of images of index z−1, Instructions 104B: processing each preliminary semantic segmentation label using semantic segmentation labels obtained using the model on a selected image of the set of index 1, said selected image being selected as the image having the camera view which is the closest to the camera view of the image associated with the preliminary semantic segmentation label, and obtaining processed semantic segmentation labels, Instructions 104C: training the model using the set of images of index z−1 and the associated processed semantic segmentation labels, Instructions 104D: performing the steps of instructions 104A to 104C for z+1.

Figure 3:
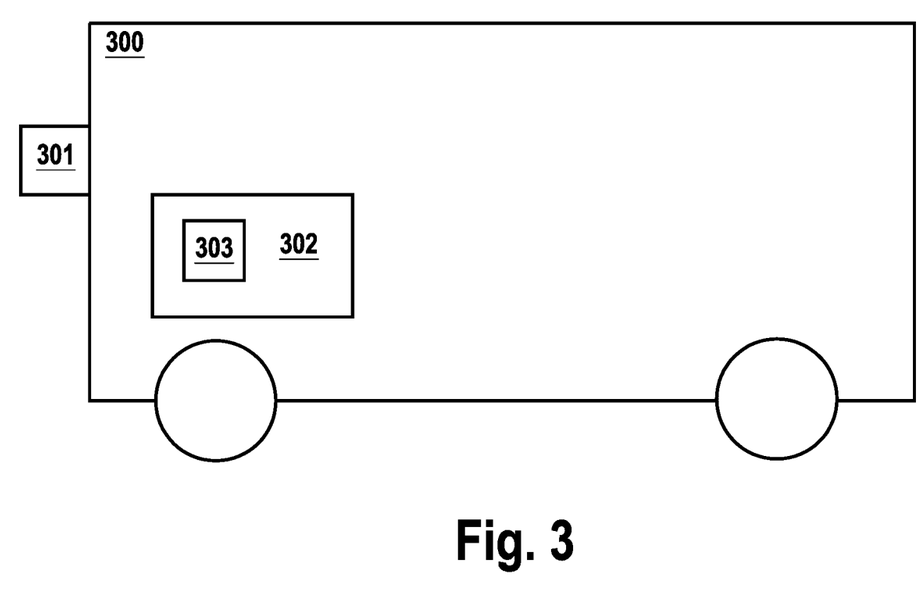
FIG. 3 shows a vehicle according to an example.

FIG. 3 shows a vehicle 300 comprising an image acquisition module 301 and a system 302 comprising a model trained by the method as described above to perform semantic segmentation on the images acquired by the image acquisition module.

Figure 4:
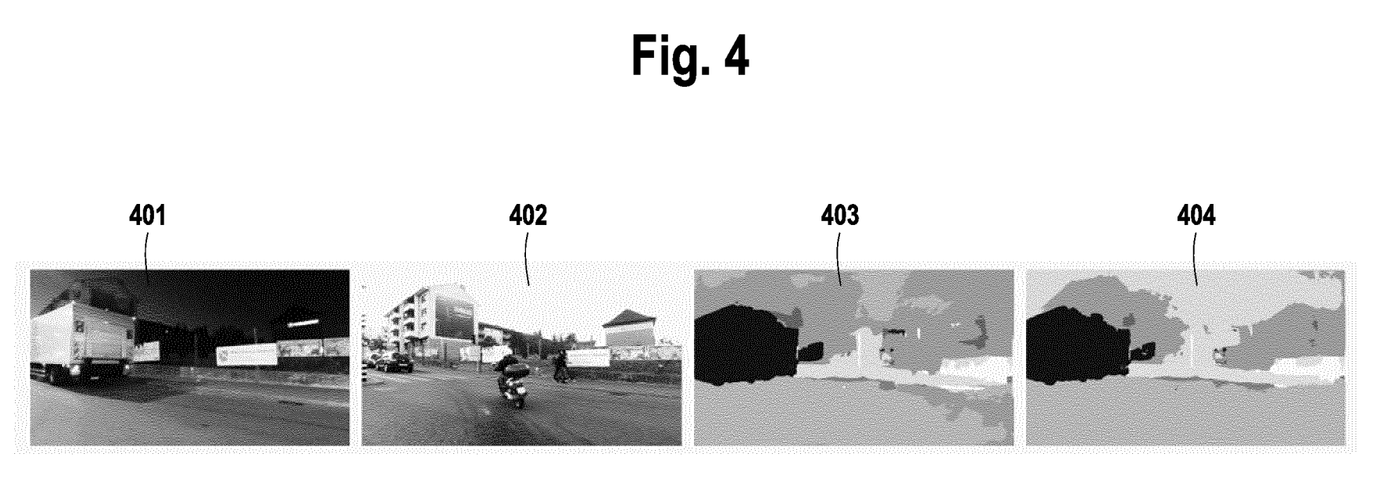
FIG. 4 shows different representations of a driving scene.

FIG. 4 shows:

401: a nighttime image $I^z$,

402: a daytime image $I^1$ which shows a camera view very close to the one of $I^z$, The preliminary semantic segmentation labels for $I^z$, and The processed semantic segmentation labels for $I^z$.

As can be seen on $I^1$, the motorbike has been detected as a dynamic object and is not taken into account to refine the processed semantic segmentation labels for $I^z$. Also, the position of the side walk is better delimited in the processed semantic segmentation labels for $I^z$.

Although the present disclosure has been described above with reference to certain specific embodiments, it will be understood that the disclosure is not limited by the particularities of the specific embodiments. Numerous variations, modifications and developments may be made in the above-described embodiments within the scope of the appended claims.

The invention claimed is:

1. A method for training a model to be used for semantic segmentation of images taken under low visibility conditions, comprising:

obtaining a plurality of sets of images, each set of images being associated with an index z comprised between 1 and Z, the index z indicating a level of visibility of the images of the set of images, 1 corresponding to the highest level of visibility and Z corresponding to the lowest level of visibility, wherein the model is initially trained to perform semantic segmentation using an annotated set of images having a level of visibility of 1 and the associated semantic segmentation labels, and for z being greater than or equal to 2, iteratively training the model comprising:

a—obtaining, for at least a first image of the set of images of index z, a preliminary semantic segmentation label by applying the model trained on the set of images of index z−1 to the first image, b—obtaining, for the at least the first image, a processed preliminary semantic segmentation label using the preliminary semantic segmentation label and a semantic segmentation label obtained by applying the initially trained model on a selected image of the set of images of index 1, the selected image being selected as the image having a camera view which is closest to a camera view of the first image by:

using a cross bilateral filter between the semantic segmentation label associated with the selected image of the set of images of index 1 and the semantic segmentation label associated with the first image, and performing a fusion of an output of the cross bilateral filter with the semantic segmentation label associated with the first image, wherein the cross bilateral filter performs:

$$\tilde{S}^1(p) = \frac{\sum_{q \in \mathcal{N}(p)} G_{\sigma_s}(\|q-p\|) G_{\sigma_r}(\|I^z(q)-I^z(p)\|) S^1(q)}{\sum_{q \in \mathcal{N}(p)} G_{\sigma_s}(\|q-p\|) G_{\sigma_r}(\|I^z(q)-I^z(p)\|)}$$

in which:

p and q are pixel positions, $\tilde{S}^1(p)$ is the output of the cross bilateral filter for a pixel p, $\mathcal{N}(p)$ is a neighborhood of p, $G_{\sigma_s}$ is a spatial-domain Gaussian kernel,
$G_{\sigma_r}$ is a color-domain kernel,
$I^z(q)$ and $I^z(p)$ respectively designate a color value at pixel q and pixel p in the first image from the set of index z, and
$S^1(q)$ is a semantic segmentation label at pixel q for the selected image of the set of images of index 1, c—training the model using:
the set of images of index z and the associated processed semantic segmentation labels, and
a synthetic set of images of index z and the associated semantic segmentation labels both generated from the annotated set of images having a level of visibility of 1 and the associated semantic segmentation labels; and
d—performing steps a to c for z+1.

2. The method of claim 1, comprising a preliminary step of obtaining the semantic segmentation labels for all the images of the set of images of index 1 using the model.

3. The method of claim 1, wherein performing the fusion of an output of the cross bilateral filter with the semantic segmentation label obtained for the first image comprises using:

$$\hat{S}^z = \frac{F^z}{F^z + \alpha F^1} S^z + \frac{\alpha F^1}{F^z + \alpha F^1} \tilde{S}^1$$

in which:
$\hat{S}^z$ is an output of a fusion function,
$F^1$ is equal to $$\max_{c \in \mathcal{C}} \tilde{S}^1_c(p)$$

and is a maximum output value of a semantic segmentation label at pixel p for the selected image of the set of images of index 1 for all possible classes $\mathcal{C}$, c designating a class having a highest output,
$F^z$ is equal to $$\max_{c \in \mathcal{C}} \tilde{S}^z_c(p)$$

and is a maximum output value of a semantic segmentation label at pixel p for the first image, and
$\alpha$ a coefficient chosen between 0 and 1.

4. The method of claim 3, wherein a is a function of a pixel p:

$$\alpha(p) = \begin{cases} \alpha_l, & \text{if } c_1 = \arg\max_{c \in \mathcal{C}} \tilde{S}^1_c(p) \in \mathcal{C}_d \text{ and } S^z_{c_1}(p) \le \eta \\ & \text{or } c_2 = \arg\max_{c \in \mathcal{C}} S^z_c(p) \in \mathcal{C}_d \text{ and } \tilde{S}^1_{c_2}(p) \le \eta, \\ \alpha_h & \text{otherwise.} \end{cases}$$

5. A system for training a model to be used for semantic segmentation of images taken under low visibility conditions, comprising at least one processor configured for:
obtaining a plurality of sets of images, each set of images being associated with an index z comprised between 1 and Z, the index z indicating a level of visibility of the images of the set of images, 1 corresponding to the highest level of visibility and Z corresponding to the lowest level of visibility,
wherein the model is initially trained to perform semantic segmentation using an annotated set of images having a level of visibility of 1 and the associated semantic segmentation labels, the at least one processor being further configured for:
for z being greater than or equal to 2, iteratively training the model by:
a—obtaining, for at least a first image of the set of images of index z, a preliminary semantic segmentation label by applying the model trained on the set of images of index z−1 to the first image,
b—obtaining, for the at least the first image, a processed preliminary semantic segmentation label using the preliminary semantic segmentation label and a semantic segmentation label obtained by applying the initially trained model on a selected image of the set of images of index 1, the selected image being selected as the image having a camera view which is closest to a camera view of the first image by:
using a cross bilateral filter between the semantic segmentation label associated with the selected image of the set of images of index 1 and the semantic segmentation label associated with the first image, and
performing a fusion of an output of the cross bilateral filter with the semantic segmentation label associated with the first image,
wherein the cross bilateral filter performs:

$$\tilde{S}^1(p) = \frac{\sum_{q \in \mathcal{N}(p)} G_{\sigma_s}(\|q-p\|) G_{\sigma_r}(\|I^z(q) - I^z(p)\|) S^1(q)}{\sum_{q \in \mathcal{N}(p)} G_{\sigma_s}(\|q-p\|) G_{\sigma_r}(\|I^z(q) - I^z(p)\|)}$$

in which:
p and q are pixel positions,
$\tilde{S}^1(p)$ is the output of the cross bilateral filter for a pixel p,
$\mathcal{N}(p)$ is a neighborhood of p,
$G_{\sigma_s}$ is a spatial-domain Gaussian kernel,
$G_{\sigma_r}$ is a color-domain kernel,
$I^z(q)$ and $I^z(p)$ respectively designate a color value at pixel q and pixel p in the first image from the set of index z, and
$S^1(q)$ is a semantic segmentation label at pixel q for the selected image of the set of images of index 1,
c—training the model using:
the set of images of index z and the associated processed semantic segmentation labels, and
a synthetic set of images of index z and the associated semantic segmentation labels both generated from the annotated set of images having a level of visibility of 1 and the associated semantic segmentation labels; and
d—performing steps a to c for z+1.

6. A model to be used for semantic segmentation trained by the method of claim 1.

7. A vehicle comprising an image acquisition module and a system comprising the model trained by the method of claim 1 to perform semantic segmentation on the images acquired by the image acquisition module.

* * * * *